(12) United States Patent
Zhang et al.

(10) Patent No.: US 11,603,797 B2
(45) Date of Patent: Mar. 14, 2023

(54) COMPARTMENT UNIT FOR TURBINE ENGINE

(71) Applicant: YANTAI JEREH PETROLEUM EQUIPMENT & TECHNOLOGIES CO., LTD., Yantai Shandong (CN)

(72) Inventors: Rikui Zhang, Yantai Shandong (CN); Peng Zhang, Yantai Shandong (CN); Chunqiang Lan, Yantai Shandong (CN); Shanwu Fu, Yantai Shandong (CN); Sheng Chang, Yantai Shandong (CN); Ruijie Du, Yantai Shandong (CN); Jian Zhang, Yantai Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 17/170,135

(22) Filed: Feb. 8, 2021

(65) Prior Publication Data

US 2022/0162991 A1 May 26, 2022

(30) Foreign Application Priority Data

Nov. 23, 2020 (CN) .......................... 202022735271.5

(51) Int. Cl.
*F02C 7/055* (2006.01)
*F02C 7/045* (2006.01)
(Continued)

(52) U.S. Cl.
CPC .............. *F02C 7/055* (2013.01); *F02C 7/045* (2013.01); *F02C 7/18* (2013.01); *F02C 7/36* (2013.01);
(Continued)

(58) Field of Classification Search
CPC ........ F02C 7/04–057; F02C 7/20; F02C 7/24; F02C 7/30; F02C 7/32; F05D 2260/96;
(Continued)

(56) References Cited

U.S. PATENT DOCUMENTS 4,050,913 A 9/1977 Roach
8,048,186 B2 * 11/2011 Mann ...................... F02C 7/052
55/483
(Continued)

FOREIGN PATENT DOCUMENTS

CN 101858254 A 10/2010
CN 101910567 A 12/2010
(Continued)

OTHER PUBLICATIONS

Brentwood.com, Drift Eliminator Supports, retrieved via Wayback machine archive, catalogued Sep. 28, 2020 (Year: 2020).*
(Continued)

*Primary Examiner* — Stephanie Sebasco Cheng
(74) *Attorney, Agent, or Firm* — Crowell & Moring LLP (57) ABSTRACT

The present invention provides compartment(s) for a turbine engine, comprising a main compartment for receiving the turbine engine and an intake compartment disposed on a side of the main compartment. The intake compartment comprises: an intake compartment body, a gas filter device and a muffler device. The gas filter device and the muffler device are disposed outside the intake port of the intake compartment. The compartment unit is configured to have a first gas path which permits air for combustion in the turbine engine to pass from the external through the gas filter device and the first muffler device in turn into the intake compartment body, and then be delivered through the exhaust port of the intake compartment to the turbine engine in the main compartment.

16 Claims, 11 Drawing Sheets

(51) Int. Cl.
*F02C 7/18* (2006.01)
*F02C 7/36* (2006.01)

(52) U.S. Cl.
CPC .... *F05D 2260/232* (2013.01); *F05D 2260/31* (2013.01); *F05D 2260/4031* (2013.01); *F05D 2260/607* (2013.01); *F05D 2260/96* (2013.01)

(58) Field of Classification Search
CPC ........... F05D 2260/608; F05D 2260/30; F05D 2260/31; F05D 2260/311; F05D 2260/37; F05D 2260/38; F05D 2240/14; F05D 2240/90–91; F05D 2230/50; F05D 2230/51; F05D 2230/52; F05D 2230/60; F05D 2230/61; F05D 2230/64; F05D 2230/642; F05D 2230/644; F05D 2230/70; F05D 2230/72; F05D 2230/80; F05D 2230/68; F05D 2260/607; F01D 25/14; F01D 25/145; F01D 25/24–26; F01D 25/28; F01D 25/285; F01D 17/02; F01D 17/08; F01D 21/003; B01D 45/04–08; B01D 46/0004; B01D 46/0005; B01D 46/0008; B01D 46/0009; B01D 46/001; B01D 46/0019; B01D 46/002; B01D 45/18; B01D 2279/60; F24F 13/28; B64D 2033/022; B64D 2033/0246
See application file for complete search history.

(56) References Cited

U.S. PATENT DOCUMENTS

| | | | |
|---|---|---|---|
| 10,092,870 B2 * | 10/2018 | Sweet | B01D 46/0019 |
| 10,895,202 B1 * | 1/2021 | Yeung | F01D 15/08 |
| 2014/0020394 A1 * | 1/2014 | Laing | F02C 7/24 |
| | | | 60/772 |
| 2015/0322859 A1 * | 11/2015 | Van Den Bossche | B01D 46/10 |
| | | | 60/39.092 |
| 2016/0032703 A1 * | 2/2016 | Broussard | E21B 43/26 |
| | | | 166/250.01 |
| 2017/0009654 A1 * | 1/2017 | Maier | F02C 7/18 |
| 2017/0292409 A1 * | 10/2017 | Aguilar | F01D 25/285 |
| 2018/0221801 A1 * | 8/2018 | Eyers | F02C 7/052 |
| 2019/0068026 A1 * | 2/2019 | Davis | F02C 7/20 |
| 2019/0295520 A1 * | 9/2019 | Johnson | B32B 15/18 |
| 2021/0046415 A1 * | 2/2021 | Tiffany | B01D 46/526 |

FOREIGN PATENT DOCUMENTS

| | | | | |
|---|---|---|---|---|
| CN | 205047308 U | | 2/2016 | |
| CN | 108444313 A | * | 8/2018 | ............. F02C 7/047 |
| CN | 108506095 A | * | 9/2018 | |
| CN | 110454285 A | * | 11/2019 | ................ F02C 7/04 |
| CN | 110454285 A | | 11/2019 | |
| CN | 110485983 A | | 11/2019 | |
| CN | 211819660 U | | 10/2020 | |
| CN | 113882950 A | * | 1/2022 | |
| CN | 114576011 A | * | 6/2022 | |

OTHER PUBLICATIONS

Brentwood Industries, Cooling Tower Drift vs. Splashout, Oct. 1, 2015, https://www.brentwoodindustries.com/resources/learning-center/cooling-tower/cooling-tower-drift-vs-splash-out/ (Year: 2015).*
James DiCampli, Jack Pan, and Mark Arsenault, Gas Turbine Air Filter System Optimization, Jan. 21, 2015, https://www.power-eng.com/emissions/policy-regulations/gas-turbine-air-filter-system-optimization/#gref (Year: 2015).*
International Search Report dated Jul. 28, 2021 for International Application No. PCT/CN2020/137106.

* cited by examiner

COMPARTMENT UNIT FOR TURBINE ENGINE

FIELD

The present invention relates to a compartment unit for a turbine engine.

BACKGROUND

Along with the development of fracturing unit technology, fracturing units using turbine engines as the power source have appeared. The turbine engine has many advantages compared with the traditional diesel engine, e.g., the power density of a single engine is large, and the engine may use 100% natural gas as the fuel to reduce the construction cost. However, there are relatively few mature and successful cases of turbine engines used as the power source in oil and gas field fracturing units, and furthermore, the turbine engines encounter a series of difficulties in actual application on account of their own characteristics.

For example, the noise of a turbine engine far exceeds that of a diesel engine, and the noise sources come from a body, an intake port and an exhaust port of the turbine engine. The noise problem existing in the previous turbine fracturing units has not been well solved. In addition, turbine engines have higher requirements for intake air amount and cleanness. How to mount sufficient air filtering devices and mufflers in a limited space of the vehicle-mounted apparatus to meet the intake air amount and cleanness of the turbine engine and meanwhile reduce the air intake noise has always been a problem. In addition, the turbine engine is installed in the compartment, and it needs to be detached out of the compartment once a major failure occurs. How to achieve quick and convenient detachment is also a problem to be solved.

Therefore, it is desirable to provide a compartment unit for a turbine engine to at least partially solve the above problems.

SUMMARY

An object of the present invention is to provide a compartment unit for a turbine engine. In the present invention, the compartment unit includes two compartments: one is for receiving the turbine engine, and the other is for air intake. The intake compartment may be provided with a filter device and a muffler device to meet the intake air amount and cleanness of the turbine engine and reduce the intake noise at the same time. Further, the arrangement of the main compartment for receiving the turbine engine allows external air to enter the main compartment to cool down the space in the main compartment, and meanwhile the main compartment may also have a filter device and a muffler device to meet cleanness of the air for cooling the main compartment and meanwhile reduces noise. The filter device and the muffler device on the intake compartment can be detached conveniently. The main compartment may further be provided with a power system base therein to facilitate the removal of the turbine engine from and into the main compartment.

According to an aspect of the present invention, there is provided the compartment unit, comprising: a main compartment for receiving a turbine engine; and an intake compartment disposed on a side of the main compartment and comprising:

an intake compartment body provided with an intake port of the intake compartment and an exhaust port of the intake compartment communicated with the main compartment;

a gas filter device disposed outside the intake port of the intake compartment;

a first muffler device disposed between the intake port of the intake compartment and the gas filter device, wherein the compartment unit is configured to have a first gas path which permits air for combustion in the turbine engine to pass from the external through the gas filter device and the first muffler device in turn into the intake compartment body, and then be delivered through the exhaust port of the intake compartment to the turbine engine in the main compartment.

According to the solution, the compartment unit includes two compartments: one is for receiving the turbine engine, and the other is for air intake. The intake compartment may be provided with the filter device and the first muffler device to meet the intake air amount and cleanness of the turbine engine and reduce the intake noise at the same time.

In an embodiment, the gas filter device comprises one inertia separator or a plurality of inertia separators arranged in parallel, and one filter or a plurality of filters arranged in parallel inside the inertia separator(s), and the inertia separator(s) and the filter(s) are detachably mounted on the intake compartment body.

In an embodiment, the filter is mounted on the intake compartment body through multiple sets of connectors, wherein each set of connector comprises a screw and a pressing plate, and wherein for each set of connector:

the screw extends in a gap between two adjacent filters, an inner end of the screw is fixed on the intake compartment body, an outer end of the screw is fixed together with the pressing plate and the pressing plate is simultaneously fixed on external surfaces of the two adjacent filters.

In an embodiment, a flange is provided on a circumferential edge of the inertia separator, and the flange is pressed against the intake compartment body by a wing sleeve assembly and a compression screw assembly.

In the above several solutions, the filter device and the first muffler device on the intake compartment are both detachably mounted on the intake compartment body to facilitate maintenance and replacement.

In an embodiment, the wing sleeve assembly comprise:

a fixing post whose inner end is fixed on the compartment body;

a wing sleeve sleeved on the fixing post and having wings capable of pressing the flange of the inertia separator inwardly;

a nut also sleeved on the fixing post and located outside the wing sleeve and configured to engage with the fixing post in a manner of threading to press the wing sleeve tightly.

According to the present solution, there is provided a specific implementation mode of the wing sleeve assembly. Quick and firm assembly and disassembly of the inertia separator can be achieved according to the present solution.

In an embodiment, the compression screw assembly comprises:

a fixing plate comprising:

a first plate located outside the flange of the inertia separator and being parallel to the flange, the first plate having a through hole with an internal thread;

a second plate which is integrally formed with the first plate to form a one-piece structure, and extends from the first plate at an angle and is fixed on the compartment body;

a compression screw being capable of running through the through hole on the first plate and being screwed tightly so that an inner end of the compression screw presses the flange of the inertia separator.

According to the present solution, there is provided a specific implementation mode of a pressing plate assembly. Quick and firm assembly and disassembly of the inertia separator can be achieved according to the present solution.

In an embodiment, the intake compartment further comprises:

a purge line aligned with a gas channel in the inertia separator;

a collection container disposed at a bottom of the inertia separator and communicated with the gas channel in the inertia separator, wherein the purge line and the collection container are configured such that the purge line can blow the impurities in the inertia separator into the collection container.

According to the present solution, a preferable setting when the inertia separate operates is provided.

In an embodiment, a combustible gas detector is disposed in the intake compartment.

According to the present solution, the combustible gas detector can monitor the content of combustible gas in the intake air in real time and trigger an alarm to ensure the safety of the turbine engine.

In an embodiment, the main compartment comprises:

a main compartment body provided with an intake port of the main compartment, an exhaust port of the main compartment, and a communication port communicated with the exhaust port of the intake compartment;

a gas guide device disposed at the intake port of the main compartment;

second muffler devices disposed at the intake port of the main compartment and the exhaust port of the main compartment, respectively, wherein the compartment unit is configured as having a second gas path which permits gas for cooling an internal space of the main compartment body to be guided by the gas guide device from the external through the second muffler device of the intake port of the main compartment into the main compartment body and discharged out through the second muffle device at the exhaust port of the main compartment.

According to the present solution, the arrangement of the main compartment permits external air to enter the main compartment to reduce the temperature of the space in the main compartment and can ensure that the temperature of the operation environment of the turbine engine in the main compartment is not too high.

In an embodiment, the main compartment further comprises an intake pipe located in the main compartment body and connected between the communication port and the intake port of the turbine engine.

According to this solution, there is provided a way for the main compartment to deliver air to the turbine engine.

In an embodiment, the main compartment body comprises a top wall, a bottom wall and side walls, where the top wall, the bottom wall and the side walls are all filled with a soundproof material.

In one embodiment, the main compartment body comprises a top wall, a bottom wall and side walls, where one or both of two opposite side walls of the main compartment body that are parallel to the direction of a power transmission shaft of the turbine engine is(are) provided with a soundproof door.

According to the above two solutions, the main compartment may also have the filter device, the second muffler device(s) and other sound insulation structures to meet the cleanness of the air for cooling the main compartment and meanwhile reduce the noise.

In one embodiment, the main compartment further comprises a slide rail fixedly disposed in the main compartment body, a power system base slidably disposed on the slide rail, and a driving device for driving the power system base to slide, wherein the main compartment is configured to enable the turbine engine to be directly mounted on the power system base or mounted on the power system base via a reduction gearbox.

According to this solution, the turbine engine can be easily moved out and into the main compartment.

In one embodiment, a limiting device is disposed on the slide rail and configured to prevent the power system base from sliding further when the power system base slides to a predetermined position.

According to this solution, it is possible to prevent the power system base from disengaging from the slide rail due to excessive inertia.

In one embodiment, the power system base is provided with forklift holes.

According to this solution, the power system base can be conveniently moved into or out of the main compartment by a forklift.

In one embodiment, the intake compartment further comprises an openable shield plate which arranged at the intake port of the intake compartment and outside the gas filter device.

According to this solution, the shield plate is able to prevent rainwater and impurities from entering the intake compartment while not in use.

BRIEF DESCRIPTION OF THE DRAWINGS

Reference may be made to preferred embodiments shown in the figures to enable better understanding of the above and other objects, features, advantages and functions of the present invention. The same reference numerals in the figures denote the same parts. Those skilled in the art should appreciate that the figures are intended to schematically illustrate the preferred embodiments of the present invention, and not intended to impose any limitations to the scope of the present invention. All parts in the figures are not drawn to scale.

LISTING OF REFERENCE NUMBERS

100 Compartment unit
1 Main compartment
11 Main compartment body
111 Communication port
12 Gas guide device
13 Intake muffler
14 Base
141 Slide rail
142 Bolt
143 Detachable bolt
15 Forklift hole
16 Exhaust muffler
17 Reduction gearbox
18 Driving device
2 Intake compartment
21 Intake compartment body
211 Shield plate
212 Drive cylinder for shield plate
22 Gas filter device
221 Inertia separator
2211 Inertia separator flange
222 Filter
23 First muffler device
24 A set of connectors
241 Screw
242 Pressing plate
1 Wing sleeve assembly
2511 Wing
2512 Wing sleeve
2513 Fixing post
2513*a* Inner end of the fixing post
2514 Nut
252 Compression screw assembly
2521 Fixing plate
2521*b* First plate
2521*a* Second plate
2522 Compression screw
2522*a* Compression screw inner end
253 Mounting screw
261 Purge line
262 Collection container
27 Combustible gas detector mounting port
28 Manhole cover
29 Intake pipe
200 Turbine engine
201 Turbine engine air intake
202 Turbine engine exhaust pipe

DETAILED DESCRIPTION OF EMBODIMENTS

Specific embodiments of the present invention will now be described in detail with reference to the figures. Those skilled in the art can implement other manners of the present invention on the basis of the preferred embodiments, and said other manners also fall within the scope of the present invention.

The invention provides a compartment unit for a turbine engine. FIG. 1 through FIG. 11 show schematic views of a preferred embodiment of the invention. First of all, it should be appreciated that the directional terms "inside" and "outside" mentioned in the text herein are relative to the compartment unit with a receiving cavity, the "inside" of a component refers to the side of component towards a center of the receiving cavity of the compartment unit, and the "outside" of the component refers to the side of the component towards the external of the compartment unit. In the text herein, some features are described by preceding them with "first" and "second". Such description is only intended to facilitate distinguishing the features. Existence of "first" does not mean that "second" certainly exists.

Figure 1:
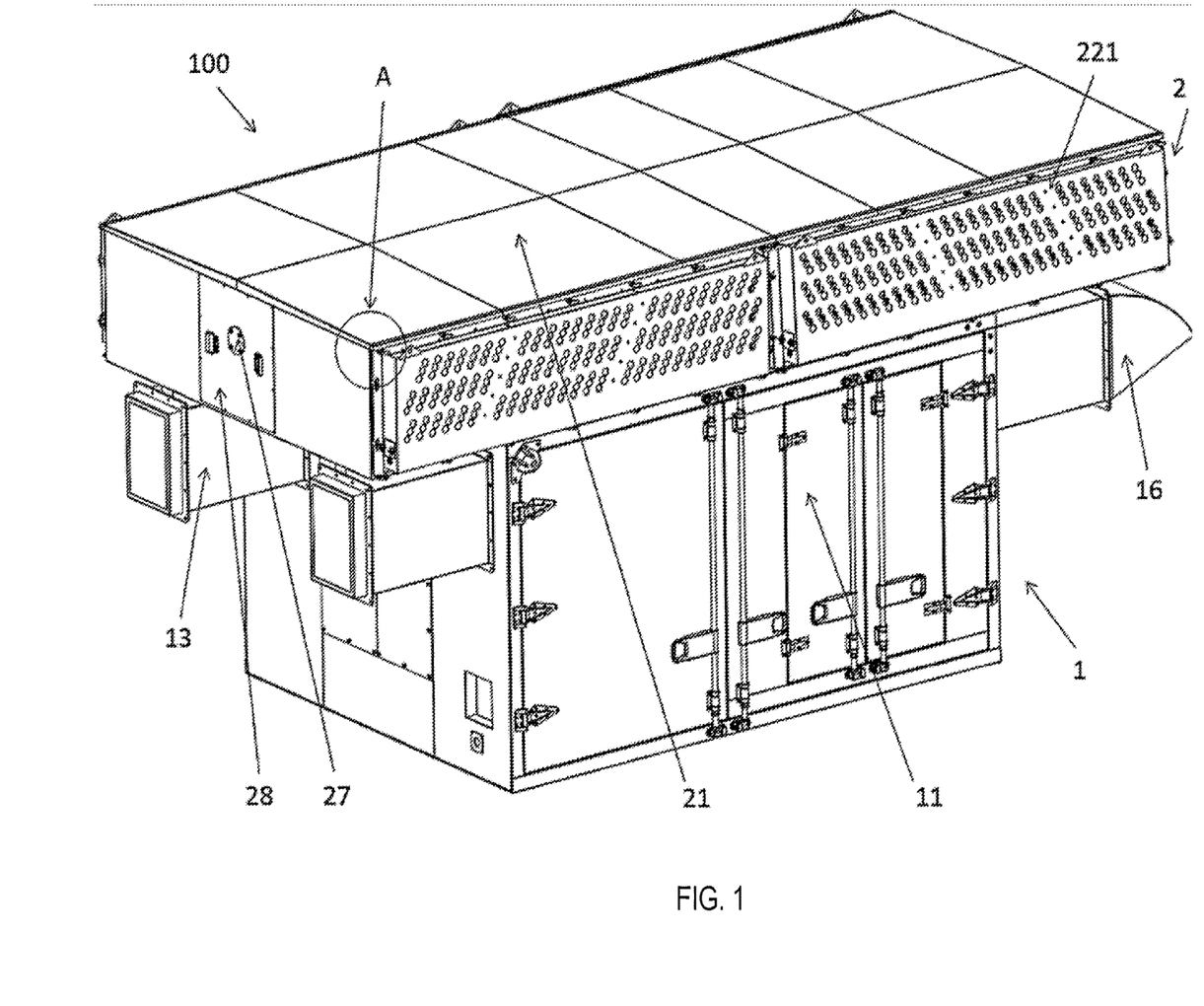
FIG. 1 shows a schematic view of an exterior of a compartment unit according to a preferred embodiment of the present invention.
Figure 2:
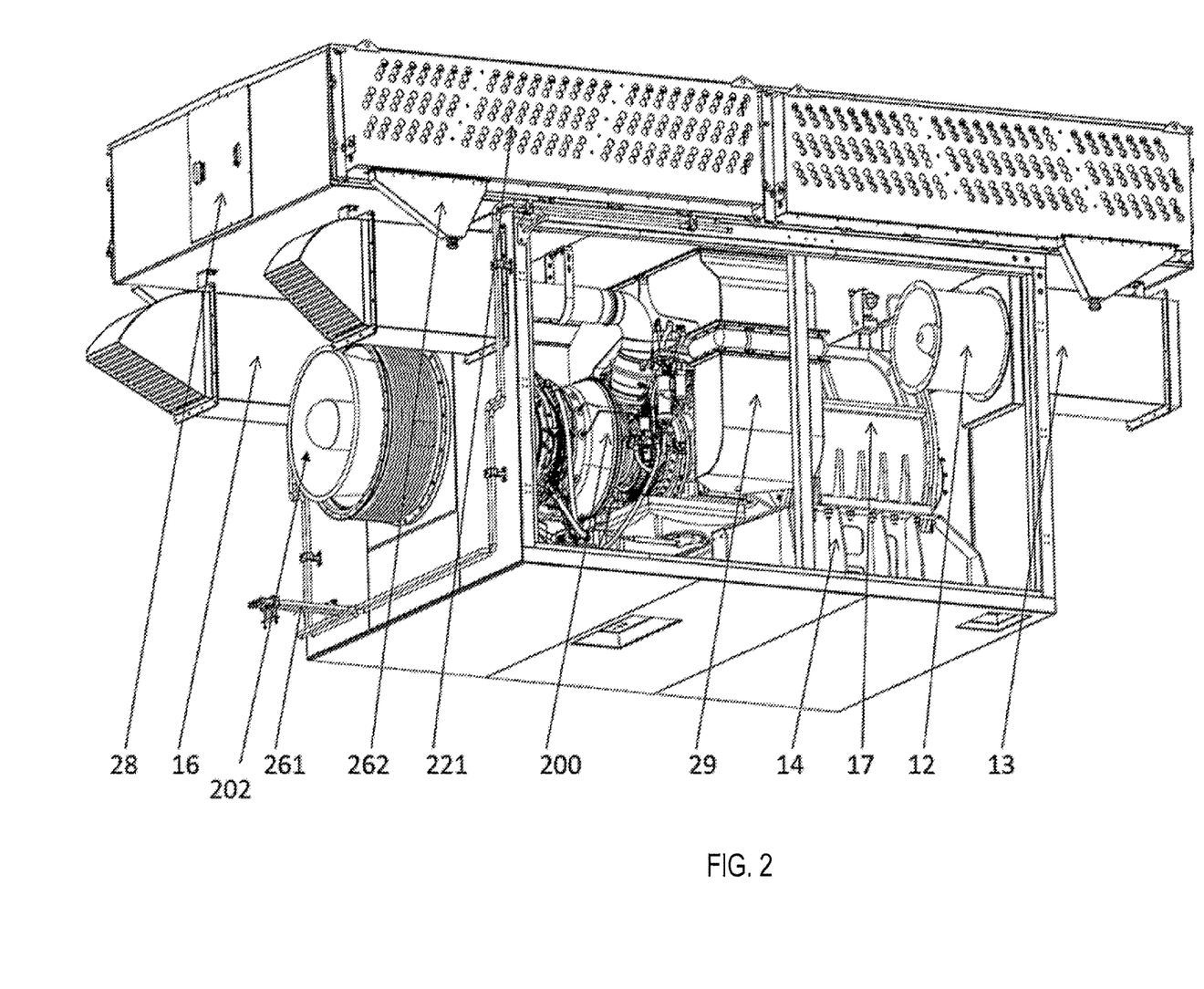
FIG. 2 shows a schematic view in which partial wall of a main compartment is detached from the compartment unit of FIG. 1 to expose the inner structures in the main compartment, with a turbine engine being mounted in the main compartment.
Figure 3:
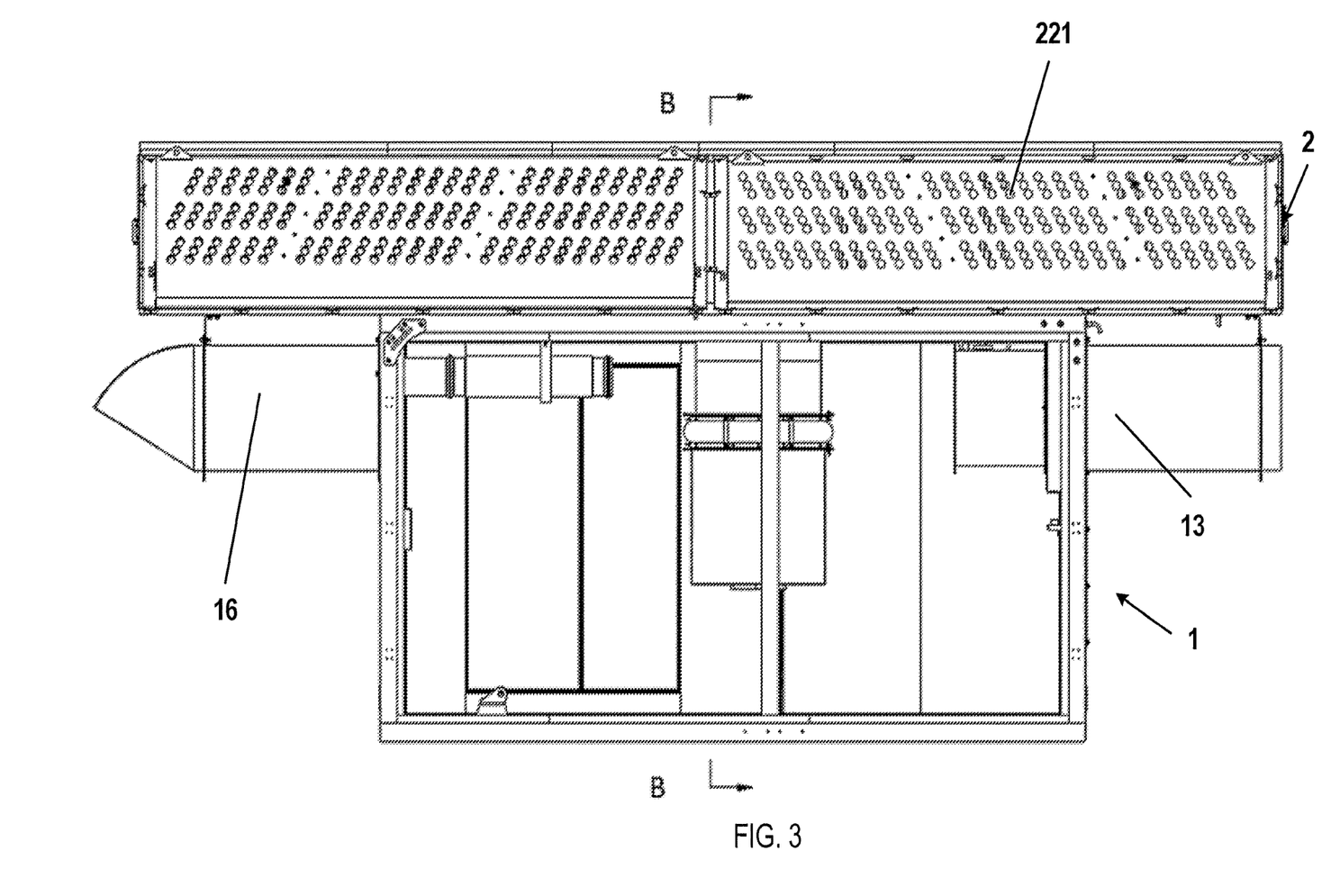
FIG. 3 is a front view of the compartment unit of FIG. 1.

Referring first to FIG. 1 and FIG. 2, a compartment unit 100 in the present embodiment includes a main compartment 1 for receiving a turbine engine 200 and an intake compartment 2 disposed on a side of the main compartment 1 and communicated with the main compartment 1. In the preferred embodiment shown in the figures, the intake compartment 2 is disposed on the main compartment 1 to deliver air to the main compartment 1; however, in other embodiments not illustrated, the intake compartment may be disposed at other side surfaces of the main compartment.

The intake compartment 2 comprises an intake compartment body 21 provided with an intake port and an exhaust port. The intake compartment further comprises a gas filter device 22 and a first muffler device 23 disposed at the intake port of the intake compartment.

The intake compartment body 21 is preferably provided with intake ports of the intake compartment on two opposed side surfaces which for example may be two surfaces parallel to a transmission shaft of the turbine engine 200. In other embodiments not illustrated, the intake compartment body 21 may also be provided with only one intake port, or a plurality of intake ports on its side walls.

Figure 5:
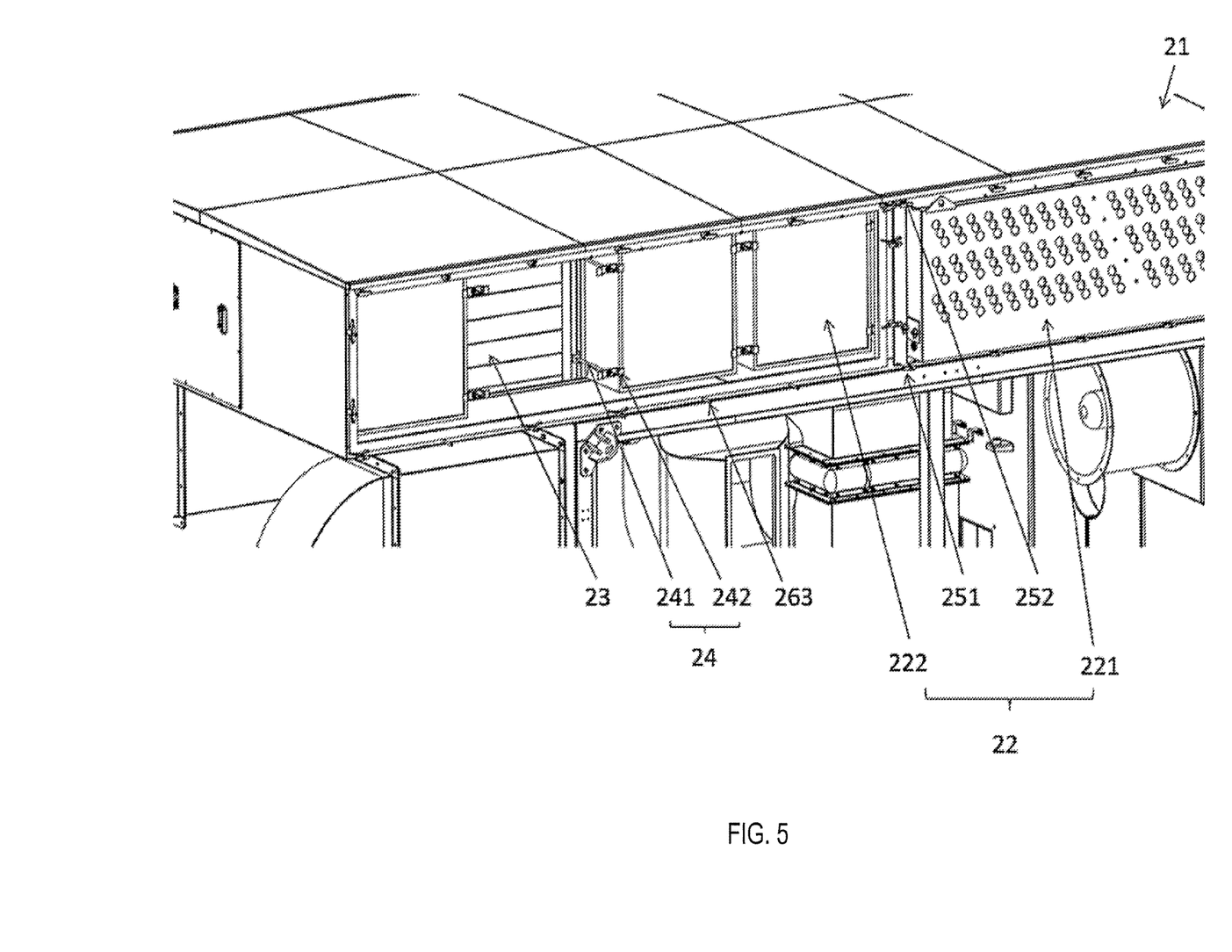
FIG. 5 is an enlarged view of an air intake compartment in FIG. 1 and FIG. 2, wherein partial structures of an inertia separator and partial structures of a filter are detached to show the filter and the muffler.
Figure 6:
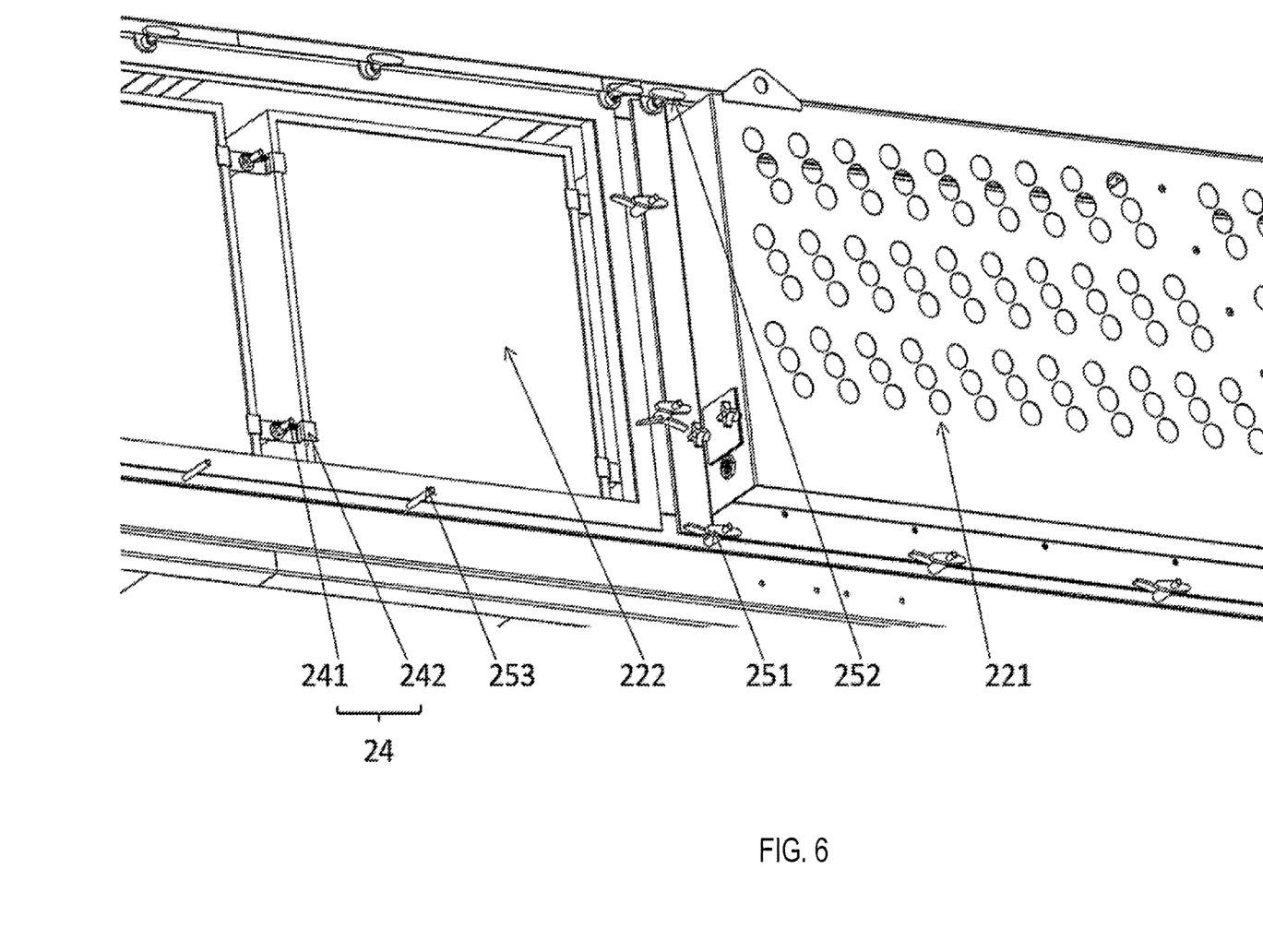
FIG. 6 is an enlarged view of the inertia separator and filter in FIG. 3.

FIG. 5 and FIG. 6 show detailed views of the gas filter device 22 and the first muffler device 23 at the intake port of the intake compartment. In the present embodiment, the intake compartment 2 comprises two sets of gas filter devices 22 and first muffler devices 23 disposed respectively outside two intake ports of the intake compartment. The gas filter device 22 is disposed outside the intake port of the intake compartment, and the first muffler device 23 is disposed between the intake port of the intake compartment and the gas filter device 22. Each set of gas filter device 22 further comprises one inertia separator 221 or a plurality of inertia separators 221 (two inertia separators in the present embodiment) arranged in parallel. The inertia separators 221 are disposed on the outsides of the filter 222. In FIG. 5 and FIG. 6, a portion of inertia separators 221 and filters 222 are detached to clearly show the positional relationship between the first muffler device 23, the filter 222 and the inertia separator 221. However, it may be appreciated that in practice, the filter 222 substantially entirely covers the outside of the first muffler device 23, the inertia separator 221 substantially entirely covers the outside of the filter 222, and the external views of the intake compartment 2 are shown in FIG. 1 and FIG. 2 when the filter device and first muffler device 23 are entirely and correctly mounted.

The exhaust port of the intake compartment 2 is communicated with the main compartment 1. Specifically, the compartment unit 100 is configured to have a first gas path which is shown by arrows in FIG. 4. The first gas path permits air for combustion in the turbine engine 200 to pass from the external through the gas filter device 22 and the first muffler device 23 in turn into the intake compartment body 21, then be delivered through the exhaust port of the intake compartment into the main compartment 1 to enter the intake pipe 29. The intake pipe 29 delivers air to the intake port 201 of the turbine engine 200. The position of the intake port 201 of the turbine engine 200 is substantially also the position of an end of the intake pipe 29. After air is delivered through the intake pipe 29 into the turbine engine 200, air is mixed with fuel in the turbine engine 200.

Figure 4:
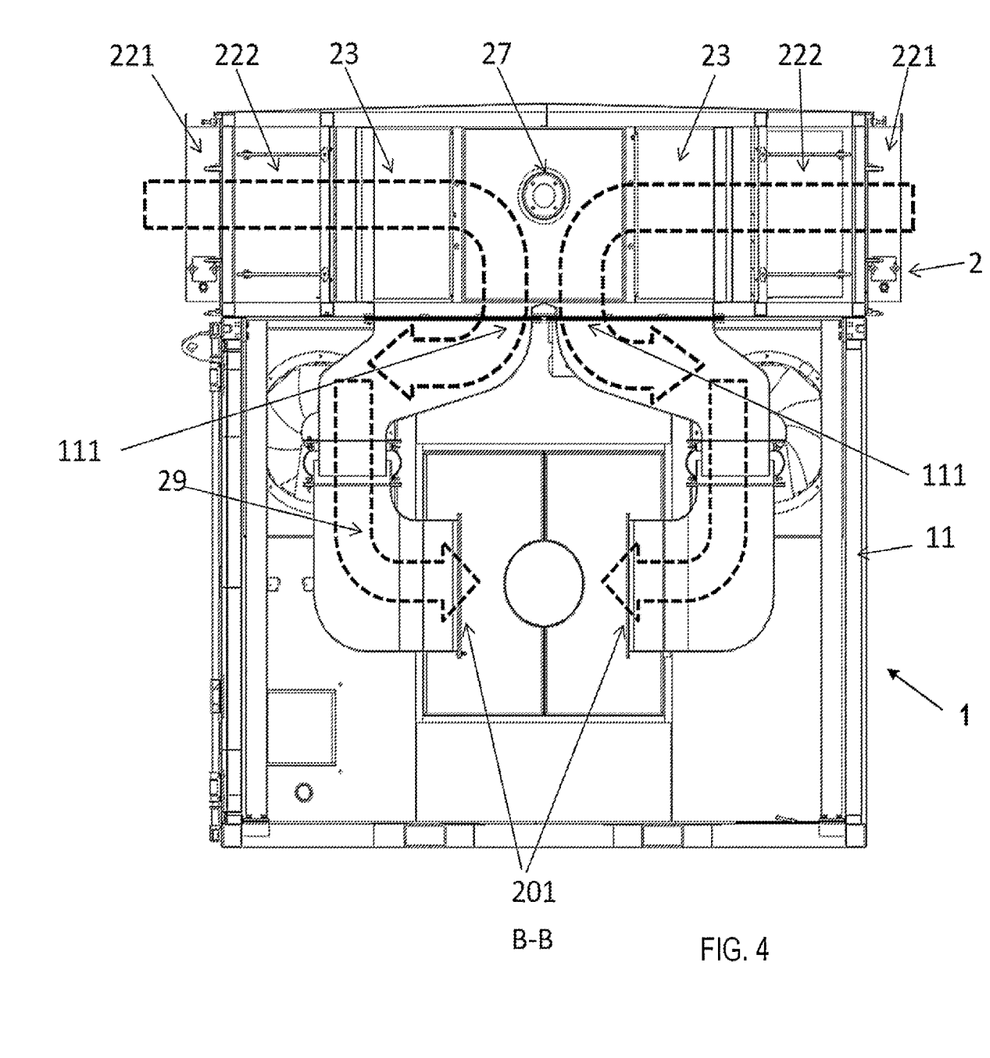
FIG. 4 is a front perspective view taking a cross-sectional view taken along line B-B of FIG. 3 as a view angle, wherein arrows show a first gas path.

During the flow of gas along the first gas path, the inertia separator 221 can filter away large solid particles in air and water, the filter 222 can further filter the gas that has passed through the inertia separator 221, and the gas discharged from the filter 222 enters the intake pipe 29 after being muffled by the first muffler device 23. The exhaust gas after combustion in the turbine engine 200 is discharged outward through the exhaust pipe 202.

It is to be appreciated that in the present embodiment, the intake pipe 29 for delivering air to the turbine engine 200 is part of the compartment unit 100; the exhaust pipe 202 for exhausting gas out of the turbine engine 200 may not be part of the compartment unit 100, and it may be specially mounted on the compartment unit 100 in use to fit with the turbine engine 200.

There may be multiple preferred embodiments for the specific mounting of the gas filter device 22 and first muffler device 23 of the intake compartment 2. In the present invention, the inertia separator 221 and filter 222 of the gas filter device 22 are both detachably mounted on the intake compartment body 21. For example, referring to FIG. 5, the filter 222 is mounted on the intake compartment body 21 via multiple sets of connectors, wherein one set of connector 24 comprises a screw 241 and a pressing plate 242, the screw 241 extends in a gap between two adjacent filters 222, an inner end of the screw 241 is fixed on the intake compartment body 21, an outer end of the screw 241 is fixed on the pressing plate 242, and the pressing plate 242 is simultaneously fixed on external surfaces of the two adjacent filters 222 to thereby press the filter 222 tightly on the external surface of the first muffler device 23.

Also preferably, referring to FIG. 6, the inertia separator 221 is pressed tightly against the intake compartment body 21 by a mounting screw 253, a wing sleeve assembly 251 and a compression screw assembly 252. A flange 2211 protrudes on the circumferential edge of the inertia separator 221. When the inertia separator 221 is mounted, the inertia separator 221 may be first placed on the mounting screw 253, and then the flange 2211 of the inertia separator 221 may be fixed via the wing sleeve assembly 251 and the compression screw assembly 252 to fix the inertia separator 221 on the main compartment body 11.

Figure 7:
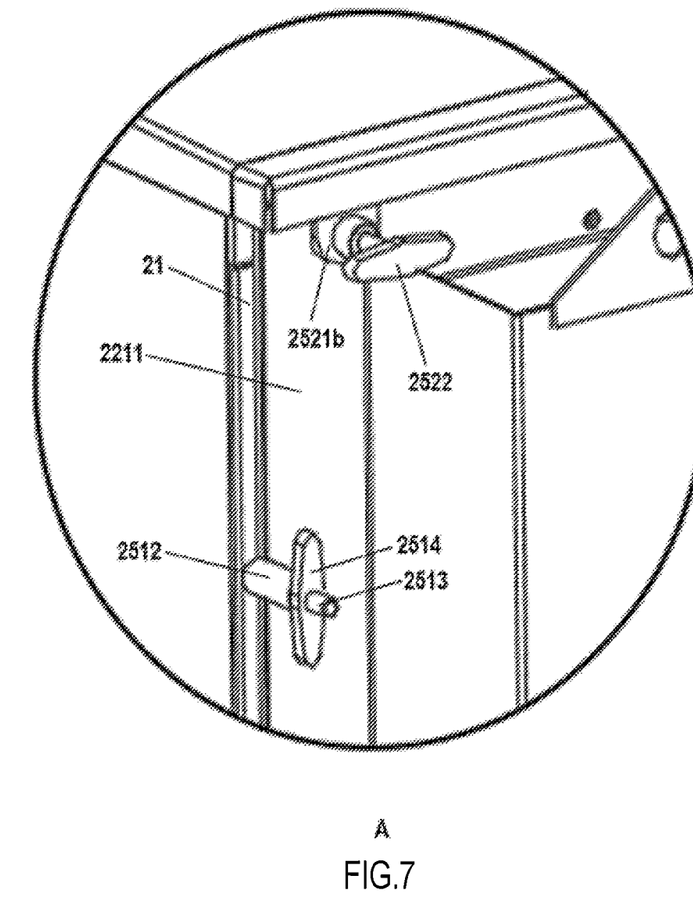
FIG. 7 is a partially enlarged view of portion A of FIG. 1.
Figure 8:
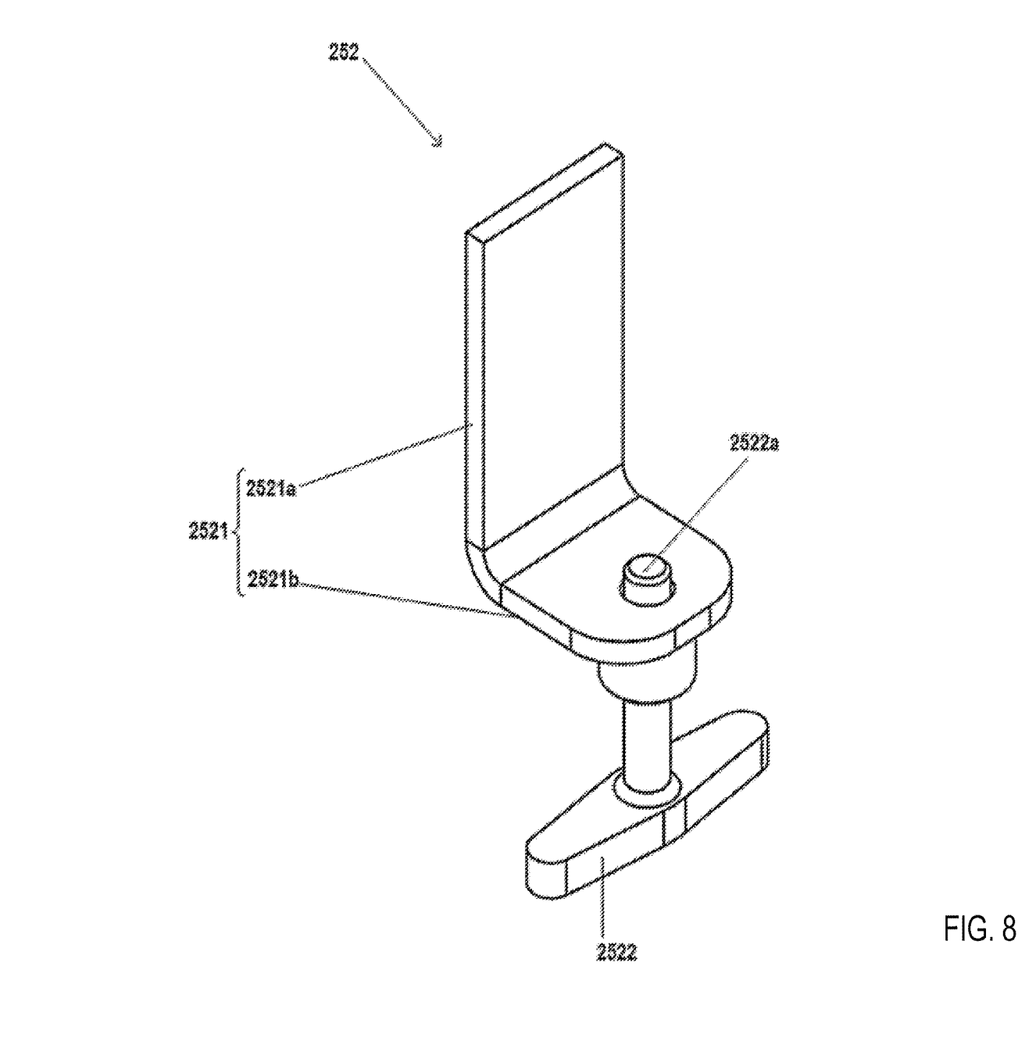
FIG. 8 is an isolated and enlarged view of a compression screw assembly of FIG. 7.

FIG. 7 and FIG. 8 show specific structures of the compression screw assembly 252 and the manner of fitting with the flange 2211 of the inertia separator 221. Referring to FIG. 7 and FIG. 8, the compression screw assembly 252 comprises a fixing plate 2521 and a compression screw 2522. The fixing plate 2521 includes a second plate 2521a and a first plate 2521b integrally forming an L-shaped structure. The first plate 2521b is located outside the flange 2211 of the inertia separator 221 and is parallel to the flange 2211. The second plate 2521a is perpendicular to the flange of the inertia separator 221 and extends inward from the first plate 2521b (it is at a right angle to the first plate 2521b) and is fixed to the compartment body 21 by welding. The first plate 2521b has a through hole provided with an internal thread. The compression screw 2522 runs through the through hole in the first plate 2521b in a threaded engagement manner and can be screwed tight so that the inner end 2522a of the compression screw 2522 presses the flange 2211 of the inertia separator 221. In order to facilitate the operation, the outer end of the compression screw 2522 is provided with a nut-like structure that is convenient for the user to perform the screwing operation.

Figure 9:
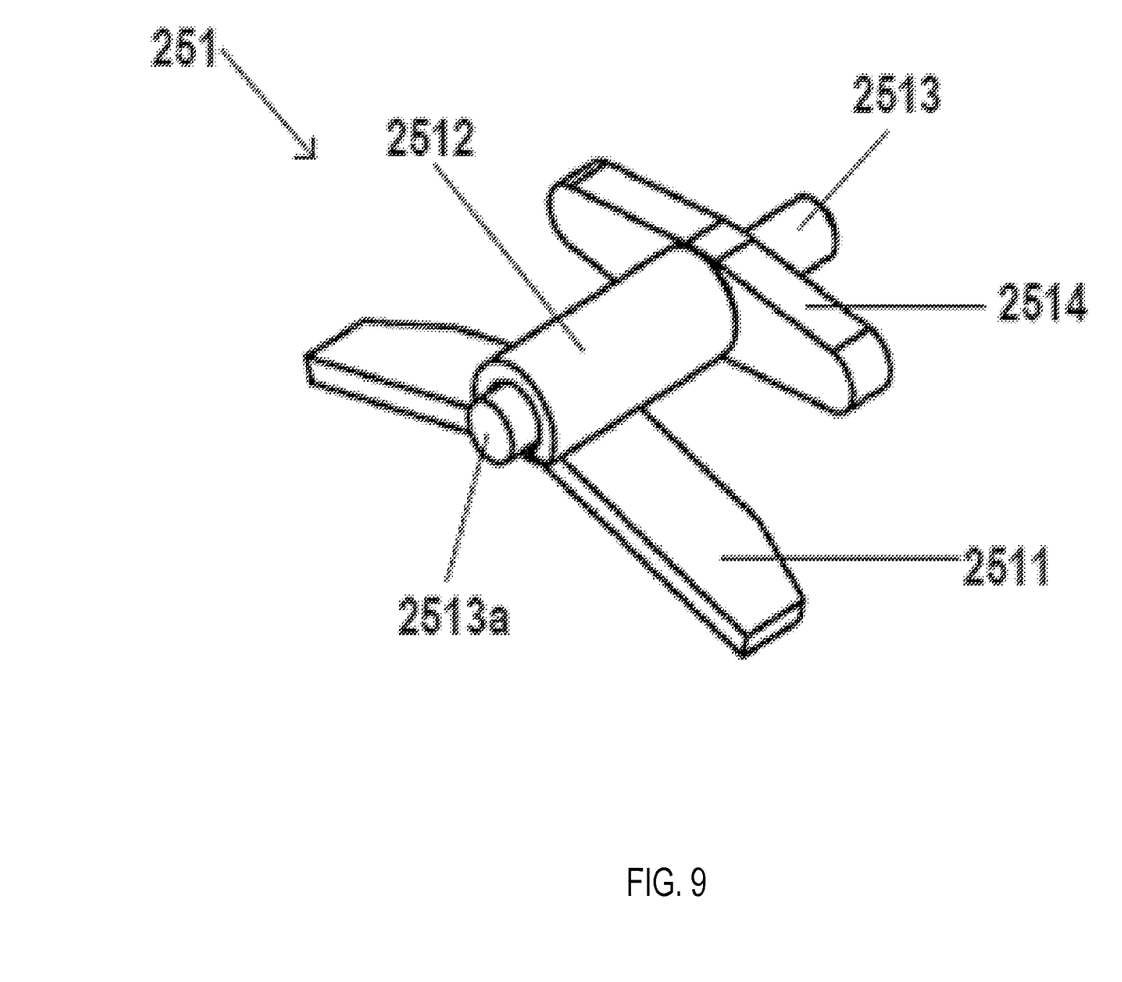
FIG. 9 is an isolated and enlarged view of a wing sleeve assembly of FIG. 7.

FIG. 7 and FIG. 9 show the specific structures of the wing sleeve assembly 251 and the manner of fitting with the flange 2211 of the inertia separator 221. Referring to FIG. 7 and FIG. 9, it can be seen that the wing sleeve assembly 251 includes a fixing post 2513, a wing sleeve 2512 and a nut 2514. An inner end 2513a of the fixing post 2513 is welded and fixed to the compartment body 21, a portion of the fixing post 2513 for joining with the nut 2514 is provided with an external thread, and other portions are not provided with threads. The wing sleeve 2512 is sleeved on the fixing post 2513, and the wing sleeve 2512 can freely rotate around the fixed rod 2513 without pressure. The wing sleeve 2512 has wings 2511 capable of pressing the flange 2211 of the inertia separator 221. The nut 2514 is also sleeved on the fixing post 2513 and located outside the wing sleeve 2512. The nut 2514 is provided with an internal thread and can be engaged with the fixing post 2513 in a manner of threading to be screwed tightly, thereby pressing the wing sleeve 2512 inwardly so that the wings 2511 of the wing sleeve 2512 tightly presses the flange 2211 of the inertia separator 221 on the compartment body 21.

In the above-mentioned installation manner, the detachment of the pressing plate 242, the wing sleeve assembly 251 and the compression screw assembly 252 may be performed purely manually without special tools, and these components needn't be completely detached, which may prevent the loss of the components. The gas filter device 22 and the first muffler device 23 of the intake compartment 2 are detachably mounted on the intake compartment. body 21 to facilitate maintenance and replacement.

Turning back to FIG. 2, the intake compartment 2 further includes a purge line 261 and a collection container 262 used in conjunction with the inertia separator 221. A purging end of the purge line 261 is aligned with a gas channel in the inertia separator 221, and the collection container 262 is disposed at a bottom of the inertia separator 221 and can communicate with the gas channel in the inertia separator 221. The purge line 261 can blow the impurities in the inertia separator 221 into the collection container 262.

In the present embodiment, the intake compartment 2 may further be provided with a combustible gas detector which may be mounted at a mounting port 27 of the combustible gas detector as shown in FIG. 1. The combustible gas detector can monitor the content of combustible gas in the intake air in real time and trigger an alarm to ensure the safety of the turbine engine 200.

Further referring to FIG. 1, the intake compartment body 21 is further provided with a manhole for maintenance personnel to enter, and an openable manhole cover 200 may be mounted on the manhole. The setting of the manhole can facilitate the maintenance personnel to enter the intake compartment for inspection and maintenance.

Figure 11:
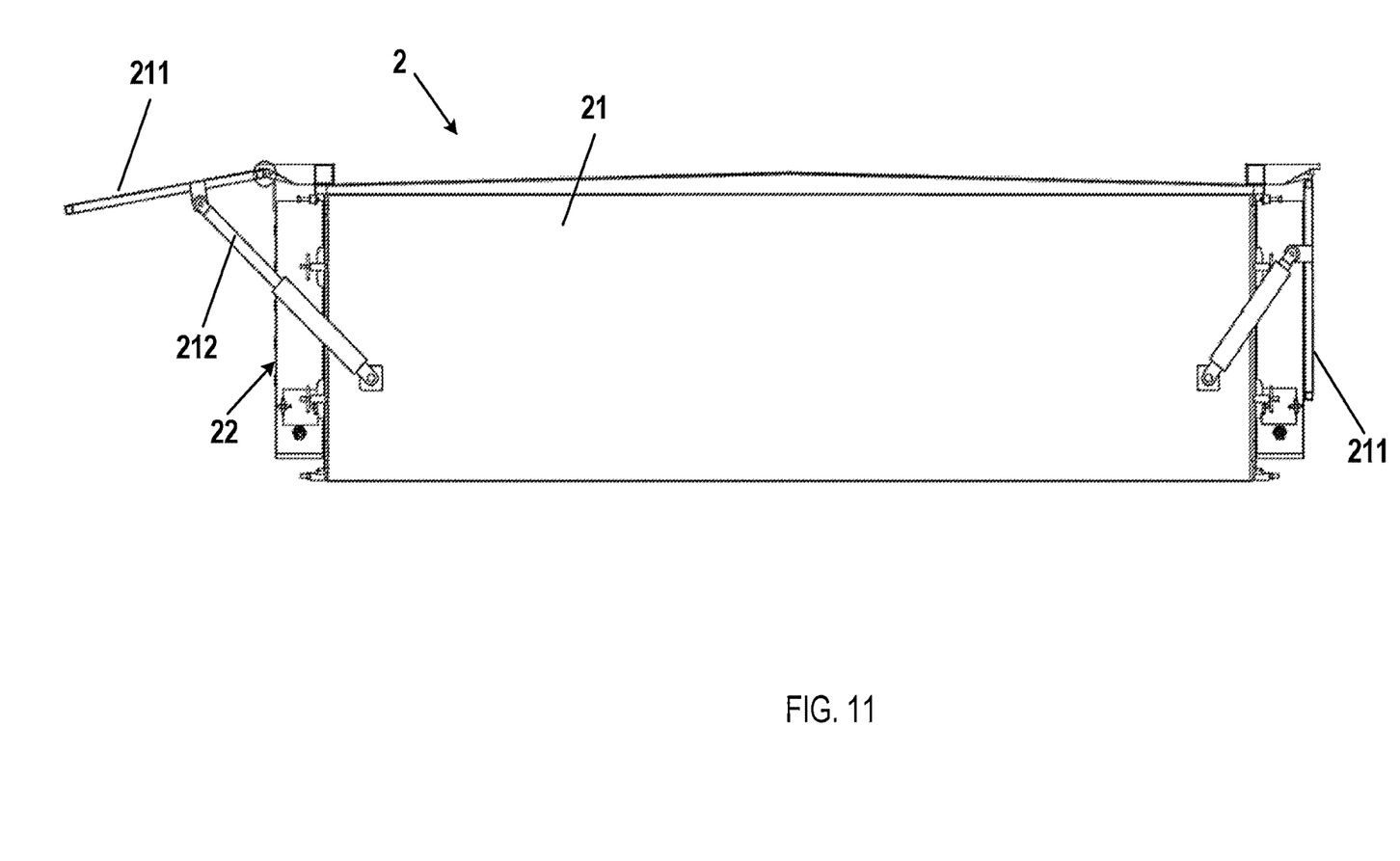
FIG. 11 is a side view of the separate air intake compartment according to the preferred embodiment, which shows a rain shield.

Preferably, referring to FIG. 11, the intake compartment 2 further comprises an openable shield plate arranged outside the gas filter device 22. The shield plate 211 can be opened and closed when driven by the drive cylinder 212 for shield plate. The shield plate 211 is able to prevent rainwater and impurities from entering the intake compartment 2 while not in use.

The main compartment 1 of the compartment unit 100 of the present embodiment may also have various preferred settings. Referring to FIG. 1 and FIG. 2, the main compartment 1 includes a main compartment body 11, a gas guide device 12 and second muffler device(s). The main compartment body 11 is provided with an intake port, an exhaust port, and a communication port 111 communicated with the exhaust port of the intake compartment. The communication port 111 of the main compartment 1 is shown in FIG. 4, and the position of the communication port 111 shown in the figure is also the intake port of the intake pipe 29. The air from the external for the combustion in the turbine engine is delivered from the intake compartment 2 into the intake pipe 29 through the communication port 111 of the main compartment 1.

The gas guide device 12 is, for example, a fan, and the gas guide device 12 is disposed at the intake port of the main compartment body 11. The second muffler device for example includes an intake muffler 13 mounted at the intake port of the main compartment and an exhaust muffler 16 mounted at the exhaust port of the main compartment.

The main compartment 1 provides a second gas path for the compartment unit 100. The second gas path allows the gas for cooling the internal space of the main compartment body 11 to be driven by the gas guide device 12 from the external through the intake muffler 13 into the main compartment body 11 and discharged out of the main compartment body 11 through the exhaust muffler 16.

As described above, the compartment unit 100 in the present embodiment has two gas flow paths, namely, the first gas path and the second gas path. The gas for the combustion in the turbine engine 200 passes through the first gas path and enters the turbine engine 200 in the main compartment 1 from the external through the intake compartment 2. The gas for cooling the temperature of the gas in the main compartment body 11 pass through the second gas flow and enters the main compartment body 11 from the external and is discharged to the external.

Preferably, a top wall, a bottom wall, and side walls of the main compartment body 11 may all be filled with a sound insulation material to minimize the impact of noise generated by the turbine engine 200 on the external. Also preferably, one or both of the two opposite side walls of the main compartment body 11 that are parallel to the power transmission shaft of the turbine engine 200 may also be provided with a soundproof door for easy access for maintenance personnel. The soundproof door may be formed as a part of the side wall, and the soundproof door may also completely replace the side wall.

Figure 10:
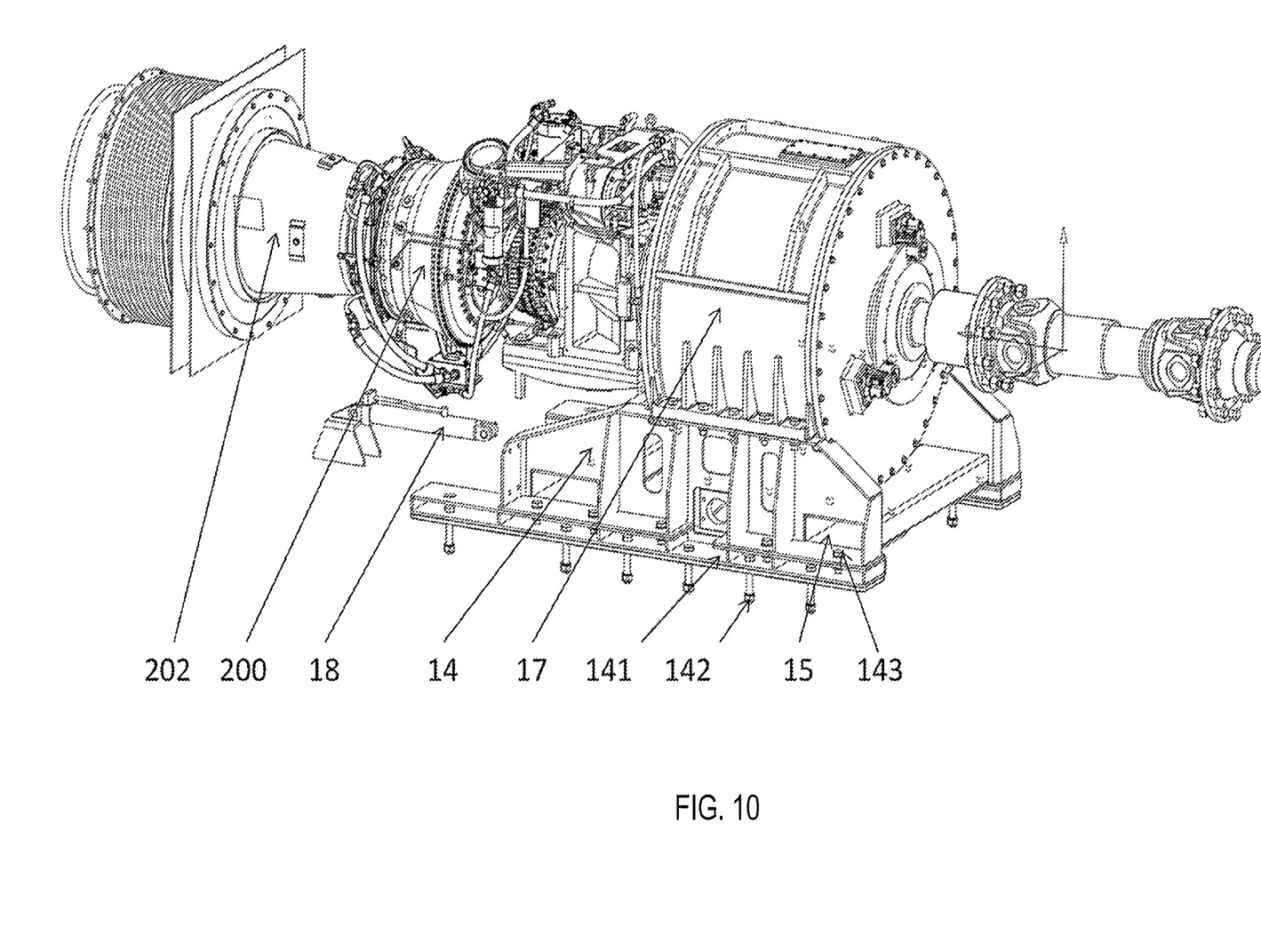
FIG. 10 is schematic view of power system base of the compartment unit, a reduction gearbox and a turbine engine mounted thereon according to the preferred embodiment.

On the other hand, referring to FIG. 2 and FIG. 10, the main compartment 1 further includes a power system base 14, a slide rail 141 and a driving device 18. The turbine engine 200 can be connected to a reduction gearbox 17 which is mounted on the power system base 14, or the turbine engine 200 is directly mounted on the power system base 14. The power system base 14 can slide on the slide rail 141 driven by the driving device 18, to facilitate the movement of the turbine engine 200 into or out of the main compartment body 11. The slide rail 141 is fixed in the main compartment body 11 by bolts 142. The driving device 18 may be, for example, an oil cylinder or an air cylinder. More preferably, forklift holes 15 are also provided on the power system base 14 to facilitate removing the power system base 14 out of the main compartment body 11.

When the turbine engine 200 operates, the power system base 14 and the slide rail 141 are fixed together with detachable bolts 143 to avoid their relative displacement; when the turbine engine 200 stops working and is to be removed, the detachable bolts 143 may be unscrewed to allow the power system base 14 to slide on the slide rail 141.

Preferably, a limiting device may be provided on the slide rail 141, and configured to prevent the power system base from sliding further when the power system base slides to a predetermined position.

According to the solution provided by the present invention, the compartment unit for a turbine engine includes two compartments: one is for receiving a turbine engine, and the other is for air intake. The intake compartment may be provided with the filter device and the first muffler device to meet the intake air amount and cleanness of the turbine engine and reduce the intake noise at the same time. Further, the arrangement of the main compartment for receiving the turbine engine allows external air to enter the main compartment to cool down the space in the main compartment, and meanwhile the main compartment may also have the filter device and the second muffler device to meet cleanness of the air for cooling the main compartment and meanwhile reduces noise. The filter device and the first muffler device of the intake compartment can be detached conveniently. The main compartment may further be provided with the power system base therein to facilitate the removal of the turbine engine from and into the main compartment.

The above depictions of various embodiments of the present invention are provided to those having ordinary skill in the art for depiction purpose, and are not intended to exclude other embodiments from the present invention or limit the present invention to a single disclosed embodiment. As described above, various alternatives and modifications of the present invention will be apparent to those of ordinary skill in the art. Accordingly, although some alternative embodiments have been described in detail, those having ordinary skill in the art will understand or readily develop other embodiments. The invention is intended to cover all alternatives, modifications and variations of the present invention described herein, as well as other embodiments falling within the spirit and scope of the present invention described herein.

We claim:

1. A compartment unit for a turbine engine, wherein the compartment unit (100) comprises:
a main compartment (1) for receiving the turbine engine (200); and
an intake compartment (2) disposed on a top side of the main compartment (1) and comprising:
an intake compartment body (21) provided with two intake compartment intake ports, and two intake compartment exhaust ports in communication with the main compartment (1);
two sets of devices, with one of the two sets of devices disposed outside and adjacent to one of the two intake compartment intake ports and the other of the two sets of devices disposed outside and adjacent to the other of the two intake compartment intake ports, wherein each set of devices comprises an air filter device (22) and a first muffler device (23) disposed between the corresponding intake compartment intake port and the corresponding air filter device,
wherein each air filter device (22) comprises an inertia separator (221) configured to trap solid particles and water in air,
wherein the inertia separators (221) are disposed on opposite sides of the intake compartment body (21);
a purge line (261) operatively connected with one of the inertia separators (221); and a collection container (262) disposed at a bottom of the one of the inertia separators (221),
wherein the purge line (261) blows at least some of the solid particles and water in the one of the inertia separators (221) into the collection container (262); and
wherein the compartment unit (100) is configured with two first air paths,
wherein each of the two first air paths permits air for combustion in the turbine engine (200) to pass from an exterior of the compartment unit into the intake compartment body successively through one of the air filter devices (22) and a corresponding one of the first muffler devices (23), and then be delivered through a corresponding one of the two intake compartment exhaust ports to the turbine engine (200) located in the main compartment (1);
and wherein one or a plurality of air filters (222) are associated with the one of the inertia separators as a part of the corresponding air filter device and are arranged downstream from the one of the inertia separators (221) with respect to the corresponding one of the two first air paths, and
wherein the one of the inertia separators comprises multiple arrays of circular inertia separation air channels and each air filter of the one or plurality of air filters is aligned with a plurality of arrays of the multiple arrays of circular inertia separation air channels of the one of the inertia separators for air intake.

2. The compartment unit according to claim 1, wherein the inertia separators (221) disposed on opposite sides of the intake compartment body (221) are arranged in parallel.

3. The compartment unit according to claim 2, wherein the inertia separators (221) and the one or plurality of air filter(s) (222) corresponding to the one of the inertia separators (221) are detachably mounted on the intake compartment body (21).

4. The compartment unit according to claim 3, wherein the one or plurality of air filters (222) comprises the plurality of air filters, wherein one of the plurality of air filters (222) is mounted on the intake compartment body (21) via multiple sets of connectors, each set of the multiple sets of connectors (24) comprising a screw (241) and a pressing plate (242), wherein for each set of the multiple sets of connectors (24):
the screw (241) extends in a gap between the one of the plurality of air filters and an adjacent one of the plurality of air filters (222), an inner end of the screw (241) is fixed on the intake compartment body (21), an outer end of the screw (241) and the pressing plate (242) are pressed tightly together and the pressing plate (242) is simultaneously attached on external surfaces of the one of the plurality of air filters and the adjacent one of the plurality of air filters (222).

5. The compartment unit according to claim 3, wherein a flange (2211) is provided on a circumferential edge of the one of the inertia separators (221), and the flange (2211) is pressed tightly against the intake compartment body (21) by a wing sleeve assembly (251) and a compression screw assembly (252).

6. The compartment unit according to claim 5, wherein the wing sleeve assembly (251) comprises: a fixing post (2513) whose inner end (2513a) is fixed on the intake compartment body (21); a wing sleeve (2512) sleeved on the fixing post (2513) and having wings (2511) capable of pressing the flange (2211) of the one of the inertia separators (221) inwardly; and a nut (2514) also sleeved on the fixing post (2513) and located outside the wing sleeve (2512) and configured to threadedly engage with the fixing post (2513) to press the wing sleeve (2512) tightly.

7. The compartment unit according to claim 5, wherein the compression screw assembly (252) comprises: a fixing plate (2521) comprising:
a first plate (2521 b) located outside of the flange (2211) of the one of the inertia separators (221) and being parallel to the flange (2211), the first plate (2521 b) having a through hole with an internal thread; and
a second plate (2521 a) which is integrally formed with the first plate (2521 b) as a one-piece structure, the second plate (2521 a) extending from the first plate (2521b) at an angle to, and being fixed on, the intake compartment body (21); and
a compression screw (2522) being capable of running through the through hole on the first plate (2521 b) and being screwed tightly so that an inner end (2522a) of the compression screw (2522) presses the flange (2211) of the one of the inertia separators (221) tightly.

8. The compartment unit according to claim 1, wherein the intake compartment (2) is provided with a combustible gas detector.

9. The compartment unit according to claim 1, wherein the main compartment (1) comprises:
a main compartment body (11) provided with a main compartment intake port, a main compartment exhaust port, and a communication port (111) communicated with at least one of the intake compartment exhaust ports, the main compartment intake port and the main compartment exhaust port being disposed at opposite ends of the main compartment (1);
an air guide device (12) disposed at the main compartment intake port; and
two second muffler devices, with one of the two second muffler devices disposed at the main compartment intake port and the other of the two second muffler devices disposed at the main compartment exhaust port,
wherein the compartment unit (100) is configured with a second air path which permits air for cooling an internal space of the main compartment body (11) to flow from the exterior of the compartment unit through the one of the two second muffler devices at the main compartment intake port into the main compartment body under guide of the air guide device (12) and then be discharged out through the other of the two second muffler devices at the main compartment exhaust port, the two second muffler devices being disposed at opposite ends of the main compartment with air flows along a same direction in the second air path.

10. The compartment unit according to claim 9, wherein the main compartment (1) further comprises an intake pipe located in the main compartment body (11) and connected between the communication port (111) and a turbine engine intake port (201) of the turbine engine (200).

11. The compartment unit according to claim 9, wherein the main compartment body (11) comprises a top wall, a bottom wall and side walls, wherein the top wall, the bottom wall and the side walls are all filled with soundproof material.

12. The compartment unit according to claim 9, wherein the main compartment body (11) comprises a top wall, a bottom wall and side walls, wherein one or both of two opposing walls of the side walls of the main compartment body that are parallel to a direction of a power transmission shaft of the turbine engine is/are provided with a soundproof door.

13. The compartment unit according to claim 9, wherein the main compartment (1) further comprises a slide rail (141) fixedly disposed in the main compartment body (11), a power system base (14) slidably disposed on the slide rail (141), and an oil cylinder or an air cylinder (18) for driving the power system base (14) to slide, wherein the main compartment (1) is configured to enable the turbine engine (200) to be directly mounted on the power system base (14) or mounted on the power system base (14) via a reduction gearbox (17).

14. The compartment unit according to claim 13, wherein the power system base (14) is provided with forklift holes (15).

15. The compartment unit according to claim 1, wherein the intake compartment (2) further comprises an openable shield plate (211) which is arranged at an outer side of one of the air filter devices (22).

16. A compartment unit for a turbine engine, wherein the compartment unit (100) comprises:
- a main compartment (1) for receiving the turbine engine (200); and
- an intake compartment (2) disposed on a top side of the main compartment (1) and comprising:
- an intake compartment body (21) provided with two intake compartment intake ports and two intake compartment exhaust ports communicated with the main compartment (1),
- two sets of devices, with one the two sets of devices disposed outside and adjacent to one of the two intake compartment intake ports and the other of the two sets of devices disposed outside and adjacent to the other of the two intake compartment intake ports,
- wherein each set of devices comprises an air filter device (22) and a first muffler device (23) disposed between the corresponding intake compartment intake port and the corresponding air filter device;
- wherein the compartment unit (100) is configured with two first air paths,
- wherein each of the two first air paths permits air for combustion in the turbine engine (200) to pass from an exterior of the compartment unit into the intake compartment body successively through one of the air filter devices (22) and a corresponding one of the first muffler devices (23), and then be delivered through a corresponding one of the two intake compartment exhaust ports to the turbine engine (200) located in the main compartment (1);
- wherein one of the air filter devices (22) comprises one or a plurality of inertia separators (221), and one or a plurality of air filters (222) arranged downstream from the one or plurality of inertia separators (221);
- wherein the one or plurality of air filters (222) are associated with the one or plurality of inertia separators as a part of the corresponding air filter device and are arranged downstream from the one or plurality of inertia separators (221) with respect to the corresponding one of the two first air paths;
- a purge line (261) operatively connected with one of the one or plurality of inertia separators (221); and
- a collection container (262) disposed at a bottom of the one of the one or plurality of inertia separators (221), wherein the purge line (261) blows at impurities in the one of one or plurality of inertia separators (221) into the collection container (262); and
- wherein the one or plurality of inertia separators each comprises multiple arrays of circular inertia separation air channels and each air filter of the one or plurality of air filters is aligned with a plurality of arrays of multiple arrays of circular inertia separation air channels for air intake;
- wherein a flange (2211) is provided on a circumferential edge of one of the one or plurality of inertia separators (221), and the flange (2211) is pressed tightly against the intake compartment body (21) by a wing sleeve assembly (251) and a compression screw assembly (252);
- wherein the wing sleeve assembly (251) comprises:
- a fixing post (2513) whose inner end (2513a) is fixed on the intake compartment body (21), a wing sleeve (2512) sleeved on the fixing post (2513) and having wings (2511) capable of pressing the flange (2211) inwardly, and a nut (2514) also sleeved on the fixing post (2513) and located outside the wing sleeve (2512) and configured to threadedly engage with the fixing post (2513) to press the wing sleeve (2512) tightly;
- wherein the compression screw assembly (252) comprises:
- a fixing plate (2521) comprising:
- a first plate (2521 b) located on the outside of the flange (2211) and being parallel to the flange (2211), the first plate (2521 b) having a through hole with an internal thread, and a second plate (2521 a) which is integrally formed with the first plate (2521 b) as a one-piece structure,
- the second plate (2521 a) extending from the first plate (2521 b) at an angle to, and being fixed on, the intake compartment body (21), and a compression screw (2522) being capable of running through the through hole on the first plate (2521 b) and being screwed tightly so that an inner end (2522a) of the compression screw (2522) presses the flange (2211) tightly; and
- wherein the main compartment comprises:
- a main compartment body (11) provided with a main compartment intake port, a main compartment exhaust port, and a communication port (111) communicated with at least one of the intake compartment exhaust ports, the main compartment intake port and the main compartment exhaust port being disposed at opposite ends of the main compartment (1);
- an air guide device (12) disposed at the main compartment intake port; and
- two second muffler devices, with one of the two second muffler devices disposed at the main compartment intake port and the other of the two second muffler devices disposed at the main compartment exhaust port,
- wherein the compartment unit (100) is configured with a second air path which permits air for cooling an internal space of the main compartment body (11) to flow from the exterior of the compartment unit through the one of the two second muffler devices at the main compartment intake port into the main compartment body under guide of the air guide device (12) and then be discharged out through the other of the two second muffler devices at the main compartment exhaust port, the two second muffler devices being disposed at opposite ends of the main compartment with air flows along a same direction in the second air path.

* * * * *

UNITED STATES PATENT AND TRADEMARK OFFICE
CERTIFICATE OF CORRECTION

| | | |
|---|---|---|
| PATENT NO. | : 11,603,797 B2 | Page 1 of 1 |
| APPLICATION NO. | : 17/170135 | |
| DATED | : March 14, 2023 | |
| INVENTOR(S) | : Rikui Zhang et al. | |

It is certified that error appears in the above-identified patent and that said Letters Patent is hereby corrected as shown below:

In the Claims

In Column 13, Claim 16, Line 28, insert --of-- between "one" and "the".

Signed and Sealed this
Twenty-sixth Day of December, 2023

*Katherine Kelly Vidal*

Katherine Kelly Vidal
*Director of the United States Patent and Trademark Office*